United States Patent
Grootjans et al.

(10) Patent No.: US 11,057,228 B2
(45) Date of Patent: Jul. 6, 2021

(54) DEVICE AND METHOD FOR WAKE-UP SIGNALLING

(71) Applicant: Iristick NV, Sint-Martens-Latem (BE)

(72) Inventors: Riemer Grootjans, Antwerp (BE); Jasper Van Bourgognie, Antwerp (BE); Vianney Le Clément de Saint-Marcq, Brussels (BE); Peter Verstraeten, Sint-Martens-Latem (BE)

(73) Assignee: Iristick NV, Sint-Martens-Latem (BE)

( * ) Notice: Subject to any disclaimer, the term of this patent is extended or adjusted under 35 U.S.C. 154(b) by 106 days.

(21) Appl. No.: 16/464,862

(22) PCT Filed: Nov. 30, 2017

(86) PCT No.: PCT/EP2017/081058
§ 371 (c)(1),
(2) Date: May 29, 2019

(87) PCT Pub. No.: WO2018/100103
PCT Pub. Date: Jun. 7, 2018

(65) Prior Publication Data
US 2020/0228354 A1    Jul. 16, 2020

(30) Foreign Application Priority Data

Dec. 1, 2016    (EP) .................................... 16201679

(51) Int. Cl.
*H04L 12/12* (2006.01)
*G06F 1/3209* (2019.01)
(Continued)

(52) U.S. Cl.
CPC ............ *H04L 12/12* (2013.01); *G06F 1/3209* (2013.01); *H04L 12/40032* (2013.01); *H04L 12/40039* (2013.01); *H04W 52/0229* (2013.01)

(58) Field of Classification Search
CPC .... G06F 1/3206; G06F 1/3209; G06F 1/3287; H04L 12/12; H04L 12/40032; H04L 12/40039; H04W 52/0229; Y02D 30/50
See application file for complete search history.

(56) References Cited

U.S. PATENT DOCUMENTS 6,519,720 B1 *  2/2003  Mores ............... H04L 12/40032
                                                 714/43
7,243,249 B1    7/2007  Dunstan
(Continued)

FOREIGN PATENT DOCUMENTS

| CN | 202663395 U | * | 1/2013 |
| EP | 2738642 A1 | | 6/2014 |
| WO | 2008032163 A2 | | 3/2008 |

OTHER PUBLICATIONS

English language machine translation of CN 202663395 U (Year: 2013).*

*Primary Examiner* — Glenn A. Auve
(74) *Attorney, Agent, or Firm* — James Creighton Wray

(57) ABSTRACT

The present invention relates to a method for performing wake-up signalling between a host device and a client device of a communication system, said host and said client device being in a two-wire connection (1) with each other and at least one of said host and said client device being in an idle state, said host and said client device each comprising a data controller (3) arranged for data communication control and a power state controller (5) arranged to switch the device between at least an active state and said idle state, whereby the data controller of said at least one of said host and client device is disabled during the idle state. The method comprises—generating in the power state controller of said host or client device a wake-up signal and transmitting said wake-up signal via said two-wire connection to the other device, said other device being in said idle state,—detecting (Continued)

said wake-up signal with said power state controller (5) of said other device and, upon said detecting, setting a control signal to transition said other device out of said idle state.

12 Claims, 4 Drawing Sheets

(51) Int. Cl.
*H04L 12/40* (2006.01)
*H04W 52/02* (2009.01)

(56) References Cited

U.S. PATENT DOCUMENTS

| | | | |
|---|---|---|---|
| 7,293,470 B2* | 11/2007 | Mansfield | G01F 1/8436 |
| | | | 702/45 |
| 7,783,908 B2 | 8/2010 | Bogovac | |
| 8,082,455 B2 | 12/2011 | Reams | |
| 8,341,436 B2 | 12/2012 | Ehmann | |
| 2002/0162038 A1 | 10/2002 | Bullman | |
| 2005/0066022 A1 | 3/2005 | Liebenow | |
| 2008/0063129 A1* | 3/2008 | Voutilainen | H03L 7/23 |
| | | | 375/376 |
| 2008/0120512 A1 | 5/2008 | Wang | |
| 2009/0086831 A1* | 4/2009 | Punyko | H04L 25/0272 |
| | | | 375/259 |
| 2009/0267638 A1 | 10/2009 | Li | |
| 2010/0034243 A1 | 2/2010 | Feucht | |
| 2010/0122098 A1 | 5/2010 | Kay | |
| 2010/0125726 A1 | 5/2010 | Chen | |
| 2010/0329363 A1 | 12/2010 | Ng | |
| 2010/0332884 A1 | 12/2010 | Yoshida | |
| 2013/0219204 A1* | 8/2013 | Chen | G06F 1/3234 |
| | | | 713/323 |
| 2015/0033052 A1* | 1/2015 | Heiling | G06F 1/3209 |
| | | | 713/323 |
| 2015/0156032 A1* | 6/2015 | de Haas | H03K 5/2472 |
| | | | 370/463 |
| 2015/0253825 A1* | 9/2015 | Hladky | H02M 3/156 |
| | | | 713/340 |
| 2016/0018873 A1* | 1/2016 | Fernald | H04W 52/0222 |
| | | | 713/323 |
| 2016/0065409 A1* | 3/2016 | Kim | H04L 67/12 |
| | | | 709/223 |
| 2016/0098071 A1* | 4/2016 | Itou | G06F 1/26 |
| | | | 713/323 |
| 2016/0344563 A1* | 11/2016 | Bahout | H04L 12/10 |
| 2017/0068305 A1* | 3/2017 | Yu | G06F 1/3287 |
| 2018/0052791 A1* | 2/2018 | Srivastava | G06F 13/364 |
| 2018/0348722 A1* | 12/2018 | Ilijic | G05B 19/0423 |

* cited by examiner

DEVICE AND METHOD FOR WAKE-UP SIGNALLING

This application claims the benefit of European Application No. 16201679.4 filed Dec. 1, 2016 and PCT/EP2017/081058 filed Nov. 30, 2017, International Publication No. WO 2018/100103 A1, which are hereby incorporated by reference in their entirety as if fully set forth herein.

FIELD OF THE INVENTION

The present invention is generally related to the field of data communication. More in particular, it relates to communication with wake-up function between devices of a data communication system over a two-wire connection.

BACKGROUND OF THE INVENTION

A communication system having a simplified scheme as illustrated in FIG. 1 is considered. The communication system comprises two or more devices. In the figure two devices are shown, one of which is acting as a host device and the other one as a client device. The two devices are connected through a two-wire connection (1), such as e.g. coaxial wire, twisted pair. This connection can transfer power and/or data. In case of data the transfer typically occurs over a high-speed link at a high bandwidth of multiple Mb/s or even multiple Gb/s. Data can be transferred unidirectionally or bidirectionally.

Each device typically comprises multiple circuits. Additionally, each system typically has a power management subsystem 7 (to generate all supplies) and a data controller 3 to transfer data, retrieve data or both. Typically the high-frequency component of the data signal(s) is sent to and provided by the data controller, which can be achieved by using a high-pass filter, such as a capacitor (C1, C2). The low-frequency component of the data signal is used for power and is typically separated using a low-pass filter, such as e.g. an inductor (L1, L2).

Provisions are implemented in each device in order to allow it to enter a low-power state. A state controller 5 is receiving power all the time, in some low power mode. As illustrated in FIG. 1, the state controller generates a signal (the ACTIVE signal), which switches the device either in Active mode or in Idle mode. This can be achieved in several ways, e.g. by disabling one or more power supplies, reducing the output voltage of a power supply, disabling an IC, configuring registers etc.

Mostly, each device can decide autonomously to transition from active to idle state (e.g., after a certain period of inactivity) or from idle to active state (e.g., after an event has occurred). Additionally, the host can decide to transition the client from active to idle state or from idle to active state. Finally, the client can decide to transition the host from active to idle state or from idle to active state.

The idle state of the device usually includes the disabling of its data controller in order to save power. By doing so, the standard means for a device to communicate over the high-speed link with another device of the communication system is removed.

Solutions to this problem have been already suggested in the prior art. WO2008/032163 is concerned with communication through a high speed serial link with power up and power down capability. A solution is proposed without using high voltage swing control and signalling. Both the transmitter and the receiver wake up only during pre-defined burst cycles. During each burst cycle, data is transmitted and received in burst mode. Outside each burst cycle, the transmitter and receiver is powered off or partially powered off. Various phase-locked loop based circuit ensure the transmitter and the receiver can be locked in frequency and phase quickly at the time of power-up. The duration of the burst cycle and the interval between two adjacent burst cycles can be either fixed or changed by upper level protocol.

In US2010/034243 a circuit configuration is presented for serial communication with wake up function. A sensor/actuator and an electronic control unit are connected bidirectionally via a two-wire line. An inexpensive serial communication is provided between the actuator and the electronic control unit at a transfer rate of up to 20 Kbit/s. The communication is able to wake up bidirectionally via a wake up switching device, which on the side of the actuator shifts the actuator out of a standby state without a quiescent current by connecting it to the supply voltage. This connection is communicated over the two wire line to the control unit, which in turn also leaves its standby mode. This departure of the control unit from its standby mode is then communicated to the actuator over the two wire line, so that at this time a self-holding of the supply voltage is achieved by holding the respective states of the supply voltage switches independently of the position of the wake up switching device.

The invention in U.S. Pat. No. 7,783,908 relates to a serial data bus communication system and more particularly to waking-up nodes in such a system. Waking up a node is achieved by means of one or more master devices sending communication signals switched between dominant and recessive values at clock intervals in frames over a serial data bus. An internal clock is used to determine the position of the signal in the communication as a number of intervals.

In US2010/125726 a thin client host wakeup method is presented to switch a thin client host from a sleep mode back to an active mode. In the proposed method the thin client receives a wake on LAN packet which was transmitted via the network over a high rate data link. The network module of the thin client generates a wakeup interrupt. This requires the high rate data link to be active during idle mode of the thin client. With a trigger signal a power module is then activated and the power module is electrically connected to a power switch. The thin client host is then switched from the sleep mode back to the active mode.

A solution for processing wake-up signals during a sleep mode of a computer in a communication network is disclosed in US2002/162038. An extended physical layer (PHY) device receives wake-up signals from a network medium, converts these signals into an additionally-encoded data packet and generates a standardized wake-up packet based on the additionally-encoded data packet. A media access controller device, coupled to the extended PHY device, receives the standardized wake-up packet and generates a wake-up notification signal in response to the standardized wake-up packet to wake up the sleeping to components of the computer. Even though the computer can receive both packet-based and non-packet-based wake-up signals, the computer has no provisions to generate similar signals to wake up other devices on the network.

Hence, there is a need for an alternative technique for a host device to wake up a client device (and, vice versa, for a client device to wake up a host device) when the high-speed link is not available.

SUMMARY OF THE INVENTION

It is an object of embodiments of the present invention to provide for a method to perform wake-up signalling between devices of a communication system when the high-speed link is not available. It is a further object of the invention to provide for a device adapted for carrying out such a method.

The above objective is accomplished by the solution according to the present invention.

In a first aspect the invention relates to a method for performing wake-up signalling between a host device and a client device of a communication system, said host and said client device being connected with each other via a two-wire connection and at least one of said host and said client device in an idle state. The host and the client device each comprise a data controller arranged for data communication control and a power state controller arranged to switch the device between at least an active state and that idle state, whereby the data controller of the at least one of the host and the client device is disabled during said idle state. The method comprises generating in the power state controller of the host or client device a wake-up signal and transmitting the wake-up signal via the two-wire connection to the other device, detecting the wake-up signal with the power state controller of said other device and, upon said detecting, setting a control signal to transition the other device out of the idle state.

The proposed solution indeed allows for bringing one of the devices from the idle state into an active state, without using the inactive data controller of that device. With the device being in an idle state is meant that the device is in a reduced activity state, wherein at least the data controller of the device is disabled. By generating a wake-up signal in the power state controller of one device and sending it to the other device, the latter can detect the transmitted signal with its power state controller, which still remains in one of its low power modes with its data controller disabled, and transition out of the idle mode by appropriately setting a control signal.

In a preferred embodiment the power state controller of the host device generates the wake-up signal and the power state controller of the client device detects the wake-up signal. That signal is then preferably a voltage waveform. In one embodiment that waveform is a pulse. Hence, in this case the communication is in the voltage domain.

In another preferred embodiment the power state controller of the client device generates the wake-up signal and the power state controller of the host device detects the wake-up signal. That signal is then preferably a current waveform. In one embodiment that waveform is a pulse. Hence, in this case the communication is in the current domain.

The connection between the host and the client device is advantageously bidirectional.

In another embodiment the wake-up signal comprises one or more data packets. Setting the control signal may then be dependent on data content of the one or more data packets.

In another aspect the invention relates to a device for use in a communication system. The device is arranged for communicating data and power over a two-wire connection. The device comprises a data controller arranged for high-speed data communication control and a power state controller arranged to switch the device between at least an active state and an idle state. The power state controller comprises generation means for generating a wake-up signal and transmission means for transmitting said wake-up signal over the two-wire link and detection means arranged for detecting while the data controller is disabled during the idle state an incoming wake-up signal and for setting a control signal to transition said device out of said idle state. This mechanism of sending and receiving wake-up signals by the power state controllers of both devices is completely independent of the data controllers of said devices; hence the mechanism can work when the data controllers are enabled as well as when they are disabled.

In one embodiment the means for generating the wake-up signal comprises a switch transistor in parallel with at least one diode, for example a Zener diode. In other embodiments any means to change the voltage over the two-wire connection can be used, such as by capacitively coupling a signal onto the two-wire link, changing the voltage of the voltage source, generating this voltage from an amplifier or any other means to generate a voltage signal.

In another embodiment the detection means comprises a comparator arranged for comparing a voltage derived from a reference with a voltage derived from said incoming wake-up signal.

In a preferred embodiment the device further comprises capacitors for stabilizing said voltage derived from said reference and said voltage derived from said incoming wake-up signal.

In one embodiment the means for generating comprises a switch transistor in series with a resistor.

In an embodiment the detection means comprises a current sensor and comparator.

In other embodiments any other mechanism can be applied which detects the change in current and asserts a signal in such case.

In another aspect the invention relates to a communication system comprising at least two devices as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
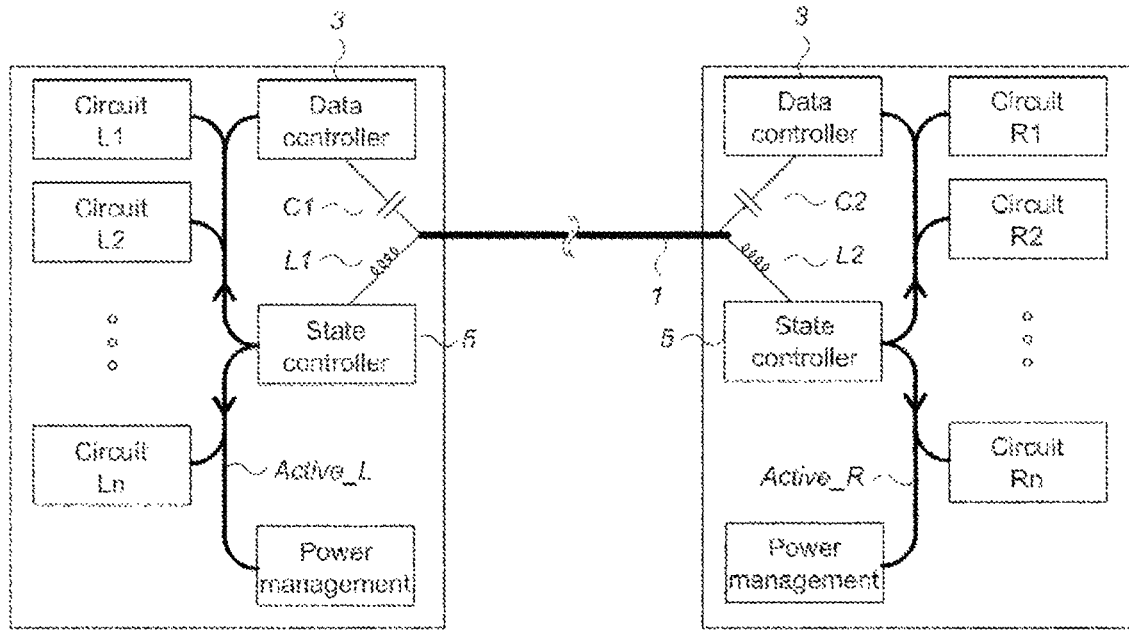
FIG. 1 illustrates a communication system comprising a host device and a client device connected via a two-wire connection.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention is concerned with communication systems comprising a plurality of devices, wherein a first and a second device of said plurality are connected via a two-wire link (like e.g. coaxial cable or twisted pair) to exchange power and high-speed data communication. Either the first device is a host device and the second device a client device or vice versa. When either device enters a power-down mode the high-speed communication link is deactivated. Because the normal means of communication between both devices has been deactivated, one device can as such no longer send a message to the other device. Therefore one device can no longer wake up the other device through this normal means of communication.

To solve this problem a mechanism is proposed here to achieve bidirectional signalling whereby only the state controllers of both devices need to be powered. Note that the state controller is still powered even when in idle state, so that it can still be used to detect the wake-up signal.

Figure 2:
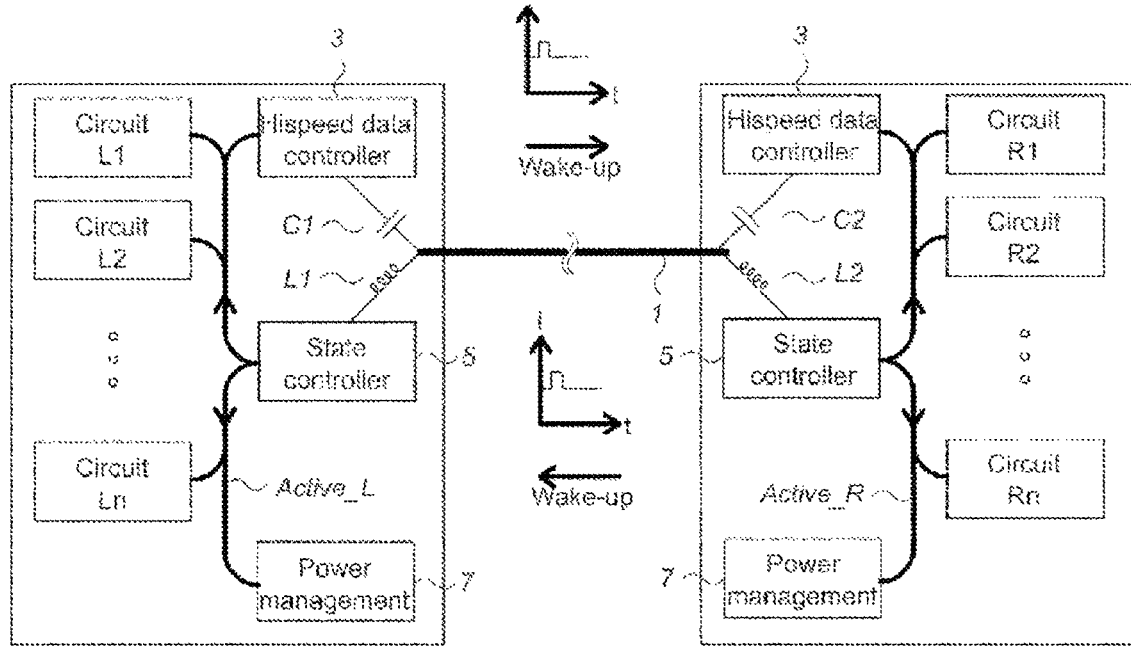
FIG. 2 illustrates a communication system arranged for implementing an embodiment of the method of the present invention.

The devices used in the communication have a basic structure as illustrated in FIG. 2, i.e. they comprise a number of circuits, a power management subsystem 7, a data controller 3 and a power state controller 5. Each device at least has an active mode and an idle mode. Optionally other levels of low power modes can be present. In other words, although FIG. 2 only shows a binary possibility (Active/Idle), the proposed concept can readily be extended to implement several levels or types of power down modes. With 'idle' is below in this description means any state of reduced activity, whereby there is no high-speed communication through the data controller of the device. The high-frequency data signal component is sent to and provided by the data controller. This can be achieved by using a high-pass filter, such as a capacitor (C1, C2). The low-frequency data signal component is used for power and can be separated using a low-pass filter, such as e.g. an inductor (L1, L2). It is this low-frequency component that is exploited for performing the wake-up signalling proposed in this invention.

In order to further explain the invention, two possible configurations are described in detail below. The first is a case where the first device is acting as host device and the second as client device. In the second case the situation is just opposite, i.e. the first device is the client and the second the host.

In case the power state controller of a host device needs to signal a client device to transition out of Idle mode, the host causes a change in the voltage supplied to the client device, e.g. a drop, a rise or a combination thereof. Even in its lowest power mode the client device has its state controller enabled, which detects the voltage change and causes the ACTIVE signal to go high. This transitions the client device into an Active state, enabling its high-speed data controller and allowing communication between both devices to be resumed over the high-bandwidth link.

Figure 3:
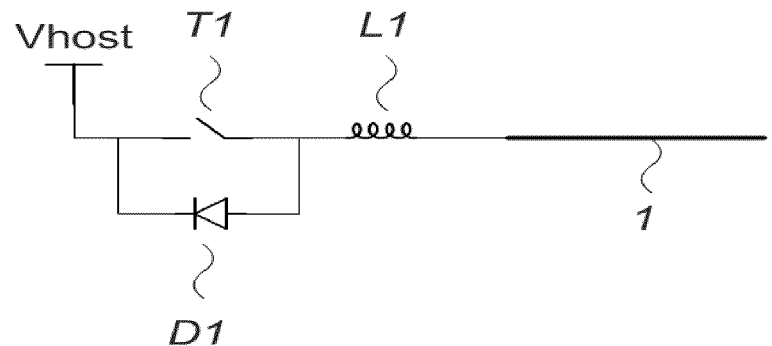
FIG. 3 illustrates an embodiment of a circuit for generating a voltage drop on a host device.

FIG. 3 illustrates an embodiment of a circuit for generating a negative voltage pulse in the power state controller of the host device. In other embodiments there may be a circuit that generates a positive voltage pulse. Also other options are available for generating a signal suitable for wake-up signaling, like e.g. a ramp, a triangular shaped signal, a sine wave, a tone, a pulse train, . . . The switch transistor T1 is chosen to have minimal resistance over its power channel, which results in minimal loss when all current passes through it during normal operation (i.e. when the pulse is not being generated). In order to generate the voltage pulse, the transistor T1 must be disabled. The voltage pulse amplitude is then determined by the diode D1 across the transistor. While the change in voltage (e.g. voltage drop) can be significant, the power loss is still low when the client device is in idle mode, as then it typically consumes only little power.

Figure 4:
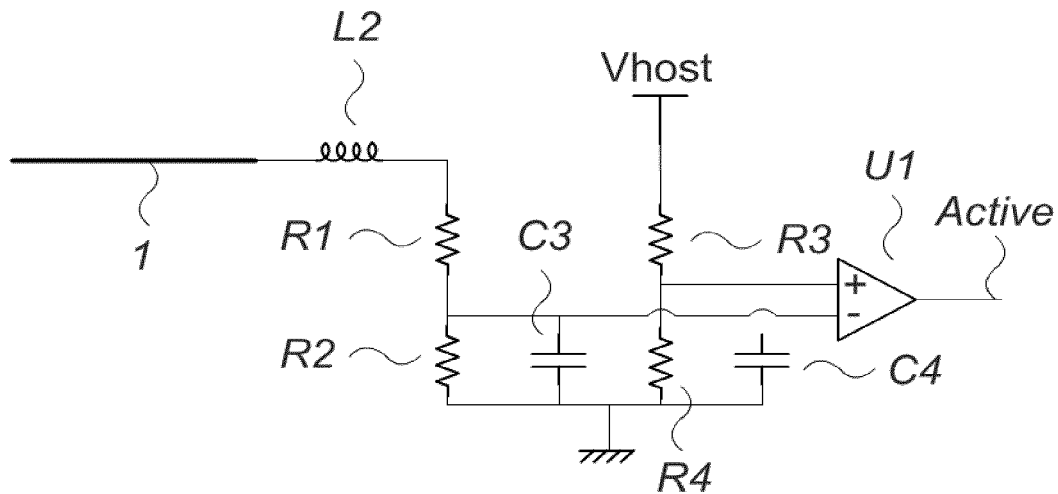
FIG. 4 illustrates an embodiment of a circuit for detecting the voltage drop on a client device.

FIG. 4 shows a possible circuit for detecting the negative voltage pulse in the state controller of the client device. Remember, however, that use of a positive voltage pulse or another type of signal is a possible alternative. First, a stable reference voltage $V_{REF}$ needs to be established off the cable voltage. This can be achieved in various ways, e.g. through a regulator, diode, bandgap voltage or other means. The reference voltage can be scaled down to any specific voltage, e.g. through a voltage divider (R3, R4). The scaled reference voltage is presented to a terminal of a comparator U1. The voltage from the cable is also scaled by a voltage divider (R1, R2). The scaled cable voltage is then presented to the other terminal of the comparator. The scaling of both voltages should result in the comparator output being low when the pulse is not present, and the output of the comparator being high when the pulse is present (or vice versa, depending on which terminals of the comparators the signals are applied).

Capacitors C3 and C4 shown in FIG. 4 can be added to stabilize voltages, at the expense of increasing the minimum pulse width.

Figure 5:
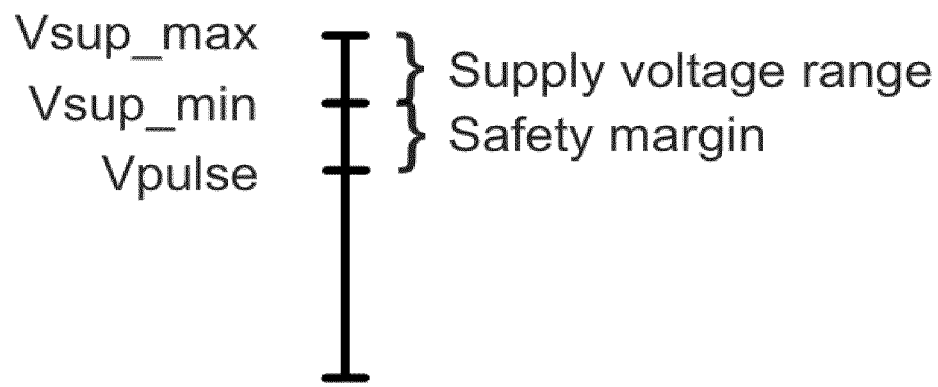
FIG. 5 illustrates a voltage drop relative to a nominal operating voltage range.

Special care needs to be taken in case the normal voltage over the cable can vary over a certain range (e.g. when the system is being powered off a battery). In such case, shown in FIG. 5, the voltages presented to the comparator should be scaled in such a way that there is a safety margin between the scaled cable voltage of the pulse voltage and the scaled cable voltage resulting from any normal cable voltage. Such a system can also implement additional circuitry to completely shut off power to the client, such as a switch or one or more transistors.

In a second scenario the first device is the client device and the second device the host. In case a client device needs to wake up a host device, the client device increases its current consumption for a short period, generating a current pulse over the cable. In other embodiments there may be a circuit that decreases its current consumption for a short period. Also other options are available for generating a current waveform suitable for wake-up signaling, like e.g. a ramp, a triangular shaped signal, a sine wave, a tone, a pulse train, . . . In its lowest power mode, the host device only has its state controller enabled, which detects the current pulse and causes the ACTIVE signal on the host device to go high. This transitions the host device into its active state, allowing communication between both devices to be resumed over the high-bandwidth link.

Figure 6:
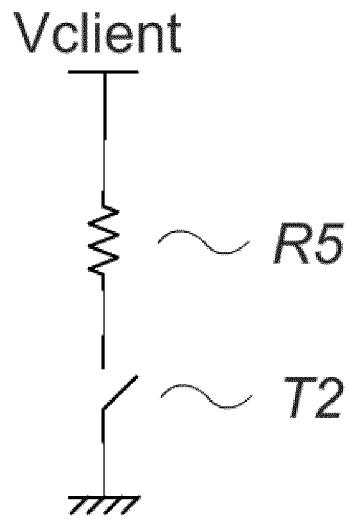
FIG. 6 illustrates an embodiment of a circuit for generating a current pulse on a client device.

FIG. 6 shows a possible circuit for generating such current pulse in the power state controller of the client device. It is repeated, however, that use of a negative current pulse or another shape of current signal is a possible alternative. By enabling the transistor T2 the cable voltage is connected to the cable ground, resulting in a current pulse. Typically this current pulse is limited by a series resistor R5.

Figure 7:
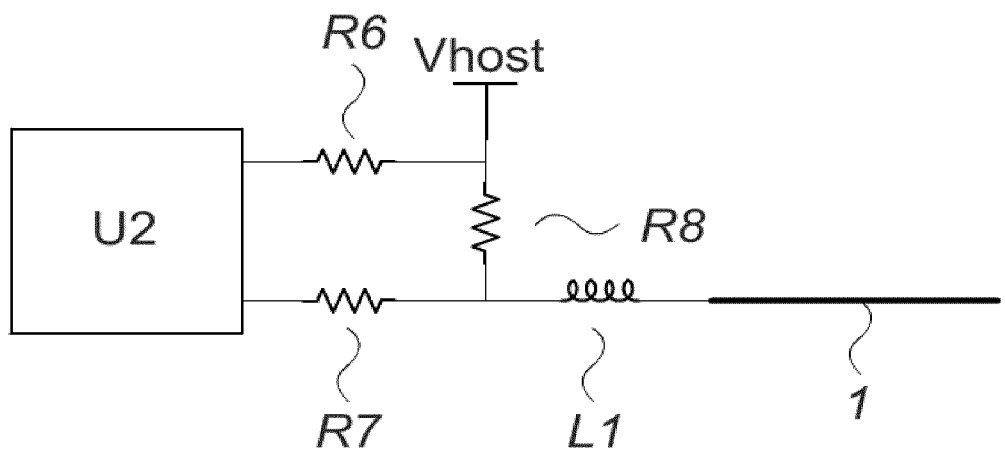
FIG. 7 illustrates an embodiment of a circuit for detecting the current pulse on the host device.

FIG. 7 shows a possible circuit for detecting this current pulse on the host device. The current pulse increases the voltage across the sense resistor R8, which is presented to a current sensor U2. The sense resistor should be dimensioned in such a way, that this rise in voltage across this sense resistor is sufficient to make the comparator change state, toggling its output signal. A differential RC circuit (R6, R7, C5) can be added to filter out noise.

Figure 8:
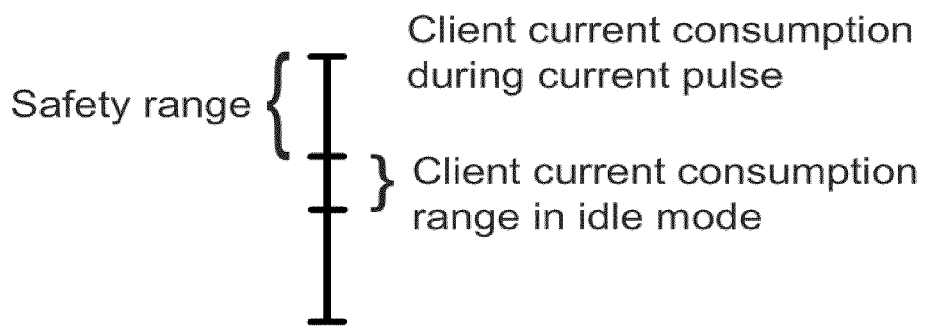
FIG. 8 illustrates that the current pulse level should be well above the nominal consumption.
Figure 9:
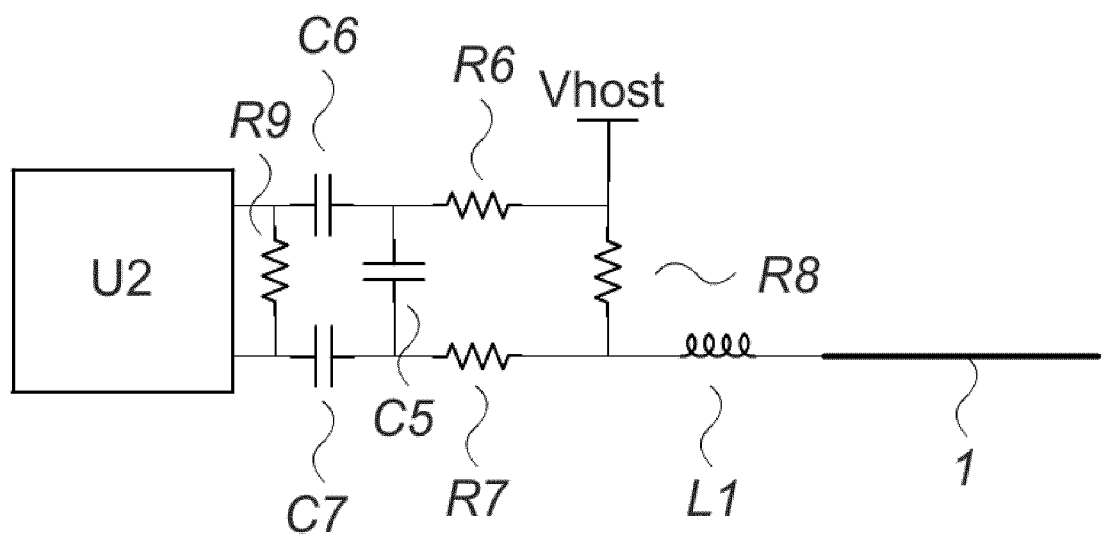
FIG. 9 illustrates a circuit for detecting relatively small current pulses on a host device.

Special care is needed in case the client device consumes a significant amount of current in its active state. The additional current spike should be sufficiently large to allow the current sensor to detect the difference, as shown in FIG. 8. Alternatively, the voltage across the current sensor can be AC-coupled using capacitors C6, C7 to the current sensor, allowing it to detect much smaller current pulses (see FIG. 9). Resistor R9 is dimensioned so U2 only sees variation of the size and duration of the intended current pulse.

Also the width of the pulse must be carefully considered. Since the power is typically passed through inductors L1, L2 on both sides of the cable, short current pulses may not be detected by the host. Larger L1, L2 inductor values require longer pulses.

Instead of sending single pulses, the above-described method can be extended to waveforms, to trains of pulses or tones or even to low-speed packet-based communication, in which the single pulses are extended to data packets to devices of which the data controller is high-speed disabled. This allows the sender to transmit messages, events or status updates. The receiver can decide autonomously how to react on this, and whether or not to wake up its data controller.

The pulses in the proposed method can act as logical highs, while they can be sequenced and extended in time to generate any logical sequence of bits. The minimum length of such a bit is defined by the clock at which this data is oversampled at the receiving side.

Since the client-to-host communication is in the current domain and the host-to-client communication in the voltage domain, both types of communication can happen at the same time, allowing for low-speed bidirectional communication without the need for enabling the high-speed data controllers.

Low-speed packet-based communication operative at rates from a few bits per second up to tens of kilobits per second allows a device to send short events or status updates to the other device which is in idle mode. In a more elaborated version of the state controller, such event or update is captured by a controller which can, upon receiving this message, either react to it or just keep track of it. As an example of the first, the client device signals it has received an event on its touchpad. Upon receiving of this message, the master decides for itself whether this event requires the enabling of the high-speed datalink. As an example of the latter, the client device transmits its internal temperature to the host at a defined interval. The host simply logs this value, but has no need to activate the high-speed link so both devices are remaining in idle mode.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Method for performing wake-up signalling between a host device and a client device of a communication system, said host and said client device being in a two-wire connection (1) to exchange power and data communication with each other and at least one of said host and said client device being in an idle state, said host and said client device each comprising a data controller (3) arranged for data communication control and a power state controller (5) arranged to switch the host device or client device between at least an active state and said idle state, whereby said data controller of said at least one of said host and said client device is disabled during said idle state, the method comprising generating in the power state controller (5) of said host device or client device a wake-up signal and transmitting said wake-up signal via said two-wire connection to the other device, said other device being in said idle state, detecting said wake-up signal with the power state controller (5) of said other device and, upon said detecting, setting a control signal to transition said other device out of said idle state;

wherein said power state controller of said client device generates said wake-up signal and said power state controller of said host device detects said wake-up signal.

2. Method for performing wake-up signalling as in claim 1, wherein said power state controller of said host device generates said wake-up signal and said power state controller of said client device detects said wake-up signal.

3. Method for performing wake-up signalling as in claim 2, wherein said wake-up signal is a voltage waveform.

4. Method for performing wake-up signalling as in claim 1, wherein said wake-up signal is a current waveform.

5. Method for performing wake-up signalling as in claim 1, wherein said connection between said host and said client device is bidirectional.

6. Device for use in a communication system, said device being arranged for communicating data and power over a two-wire link for power exchange and data communication, said device comprising a data controller (3) arranged for data communication control and a power state controller (5) arranged to switch the device between at least an active state and an idle state, wherein said power state controller (5) further comprises generation means for generating a wake-up signal and transmission means for transmitting said wake-up signal over said two-wire link, and in that said power state controller (5) comprises detection means for detecting, when said data controller (3) is disabled during said idle state, an incoming wake-up signal and for setting a control signal to transition said device out of said idle state.

7. Device as in claim 6, wherein said means for generating comprises a switch transistor (T1) in parallel with at least one diode (D1).

8. Device as in claim 6, wherein said detection means comprises a comparator arranged for comparing a voltage derived from a reference with a voltage derived from said incoming wake-up signal.

9. Device as in claim 8, further comprising capacitors for stabilizing said voltage derived from said reference and said voltage derived from said incoming wake-up signal.

10. Device as in claim 6, wherein said means for generating comprises a switch transistor (T2) in series with a resistor.

11. Device as in claim 6, wherein said detection means comprises a current sensor (U2) and comparator.

12. Communication system comprising at least two devices as in claim 6.

* * * * *